United States Patent
Murala et al.

(10) Patent No.: US 10,795,669 B2
(45) Date of Patent: Oct. 6, 2020

(54) SYSTEMS AND METHODS FOR INTEGRATING SOFTWARE SOURCE CONTROL, BUILDING, AND TESTING APPLICATIONS

(71) Applicant: ServiceNow, Inc., Santa Clara, CA (US)

(72) Inventors: Tarun Kumar Murala, Santa Clara, CA (US); Arun Vydianathan, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 136 days.

(21) Appl. No.: 16/009,820

(22) Filed: Jun. 15, 2018

(65) Prior Publication Data
US 2019/0384592 A1    Dec. 19, 2019

(51) Int. Cl.
| G06F 9/44 | (2018.01) |
| G06F 8/71 | (2018.01) |
| G06F 8/65 | (2018.01) |
| G06F 9/455 | (2018.01) |
| G06F 11/36 | (2006.01) |
| H04L 29/08 | (2006.01) |

(52) U.S. Cl.
CPC .......... G06F 8/71 (2013.01); G06F 8/65 (2013.01); G06F 9/45558 (2013.01); G06F 11/3692 (2013.01); H04L 67/34 (2013.01)

(58) Field of Classification Search
None
See application file for complete search history.

(56) References Cited

U.S. PATENT DOCUMENTS

| 6,321,229 | B1 | 11/2001 | Goldman |
| 6,678,887 | B1 | 1/2004 | Hallman |
| 6,799,189 | B2 | 9/2004 | Huxoll |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |
| 7,392,300 | B2 | 6/2008 | Anantharangachar |
| 7,617,073 | B2 | 11/2009 | Trinon |
| 7,685,167 | B2 | 3/2010 | Mueller |

(Continued)

*Primary Examiner* — Qamrun Nahar
(74) *Attorney, Agent, or Firm* — Fletcher Yoder PC (57) ABSTRACT

Systems and methods are disclosed that provide a cloud-based platform having an endpoint that receives a change event to a software application hosted by a virtual server from a management application. The change event includes a commit event, build event, or test event implemented on the software application. The management application manages commit events, build events, or test events implemented on the software application. The platform includes a change event processor that determines that the change event was generated by the management application and sends the change event to a handler based on the management application. The platform also includes the handler of a set of handlers that processes the change event based on the management application to update the software application. Each handler of the set of handlers corresponds to a respective management application and is configured to process a respective change event generated by the respective management application.

20 Claims, 8 Drawing Sheets

(56) References Cited

U.S. PATENT DOCUMENTS

| | | | |
|---|---|---|---|
| 7,716,353 B2 | 5/2010 | Golovinsky | |
| 7,769,718 B2 | 6/2010 | Murley | |
| 7,925,981 B2 | 4/2011 | Pourheidari | |
| 7,933,927 B2 | 4/2011 | Dee | |
| 7,945,860 B2 | 5/2011 | Vambenepe | |
| 8,082,222 B2 | 12/2011 | Rangarajan | |
| 8,151,261 B2 | 4/2012 | Siroa | |
| 8,380,645 B2 | 2/2013 | Kowalski | |
| 8,402,127 B2 | 3/2013 | Solin | |
| 8,554,750 B2 | 10/2013 | Rangarajan | |
| 8,560,671 B1 * | 10/2013 | Yahalom | G06F 9/45545 717/124 |
| 8,612,408 B2 | 12/2013 | Trinon | |
| 8,646,093 B2 | 2/2014 | Myers | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 9,015,188 B2 | 4/2015 | Bernie | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,535,737 B2 | 1/2017 | Joy | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 2006/0136933 A1 * | 6/2006 | Jensen | G06F 9/542 719/318 |
| 2019/0138289 A1 * | 5/2019 | Advani | G06F 8/65 |

* cited by examiner

SYSTEMS AND METHODS FOR INTEGRATING SOFTWARE SOURCE CONTROL, BUILDING, AND TESTING APPLICATIONS

BACKGROUND

The present disclosure relates generally to software application project management and, more particularly, to integrating management applications that manage development, building, and testing of software applications in a single platform.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Within the context of cloud computing, a virtual server provided by the cloud-based platform may host a software application that may be developed, built, and/or tested by software developers using client devices coupled to the virtual server. The developers may use different management applications to develop, build, and/or test the software application. For example, when developing the software application, a first developer may use a first software development management application or commit application to commit changes to the software application, whereas a second developer may use a second software development management application or commit application to commit changes to the software application.

To implement the changes committed by the first commit application in the software application, the platform provider may convert the committed changes in the format generated by the first commit application to a format usable by the platform. To implement the changes committed by the second commit application in the software application, the platform provider may convert the committed changes in the format generated by the second commit application to the format usable by the platform.

As such, because the platform may host a variety of software applications that may be developed by multiple users, each possibly using different software development management applications, converting committed changes to a format usable by the platform may be a tedious, inefficient process. Moreover, the same issue exists for other tasks related to project management, such as building and testing software applications.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes a cloud-based platform having an endpoint that receives a change event to a software application hosted by a virtual server from a management application (e.g., a third party management application). In some embodiments, the change event includes a commit event, build event, or test event implemented on the software application. As such, the management application manages commit events, build events, or test events implemented on the software application. The cloud-based platform also includes a change event processor that determines that the change event was generated by the management application and sends the change event to a handler based on the management application. The cloud-based platform further includes the handler of a set of handlers that processes the change event based on the management application to update the software application. Indeed, each handler of the set of handlers corresponds to a respective management application and is configured to process a respective change event generated by the respective management application. Advantageously, when a management application is used that does not have a corresponding handler in the set of handlers provided by the cloud-based platform, the corresponding handler may simply be developed or built and added to the platform, without affecting operation of the already existing handlers. In some embodiments, the cloud-based platform includes a custom implementation that modifies the handler based on a user's preferences.

In this manner, the cloud-based platform provides a flexible, scalable, and robust solution that implements commit, build, and test events managed by multiple third-party management applications on a software application.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The present disclosure is directed to a system, components of the system, and methods that implement commit, build, and test events managed by multiple third-party management applications on a software application. A cloud-based platform having an endpoint receives a change event to a software application hosted by a virtual server from a management application (e.g., a third party management application). In some embodiments, the change event includes a commit event, build event, or test event implemented on the software application. As such, the management application manages commit events, build events, or test events implemented on the software application. The cloud-based platform also includes a change event processor that determines that the change event was generated by the management application and sends the change event to a handler based on the management application. The cloud-based platform further includes the handler of a set of handlers that processes the change event based on the management application to update the software application. Indeed, each handler of the set of handlers corresponds to a respective management application and is configured to process a respective change event generated by the respective management application. Advantageously, when a management application is used that does not have a corresponding handler in the set of handlers provided by the cloud-based platform, the corresponding handler may simply be developed or built and added to the platform, without affecting operation of the already existing handlers. In some embodiments, the cloud-based platform includes a custom implementation that modifies the handler based on a user's preferences.

Figure 1:
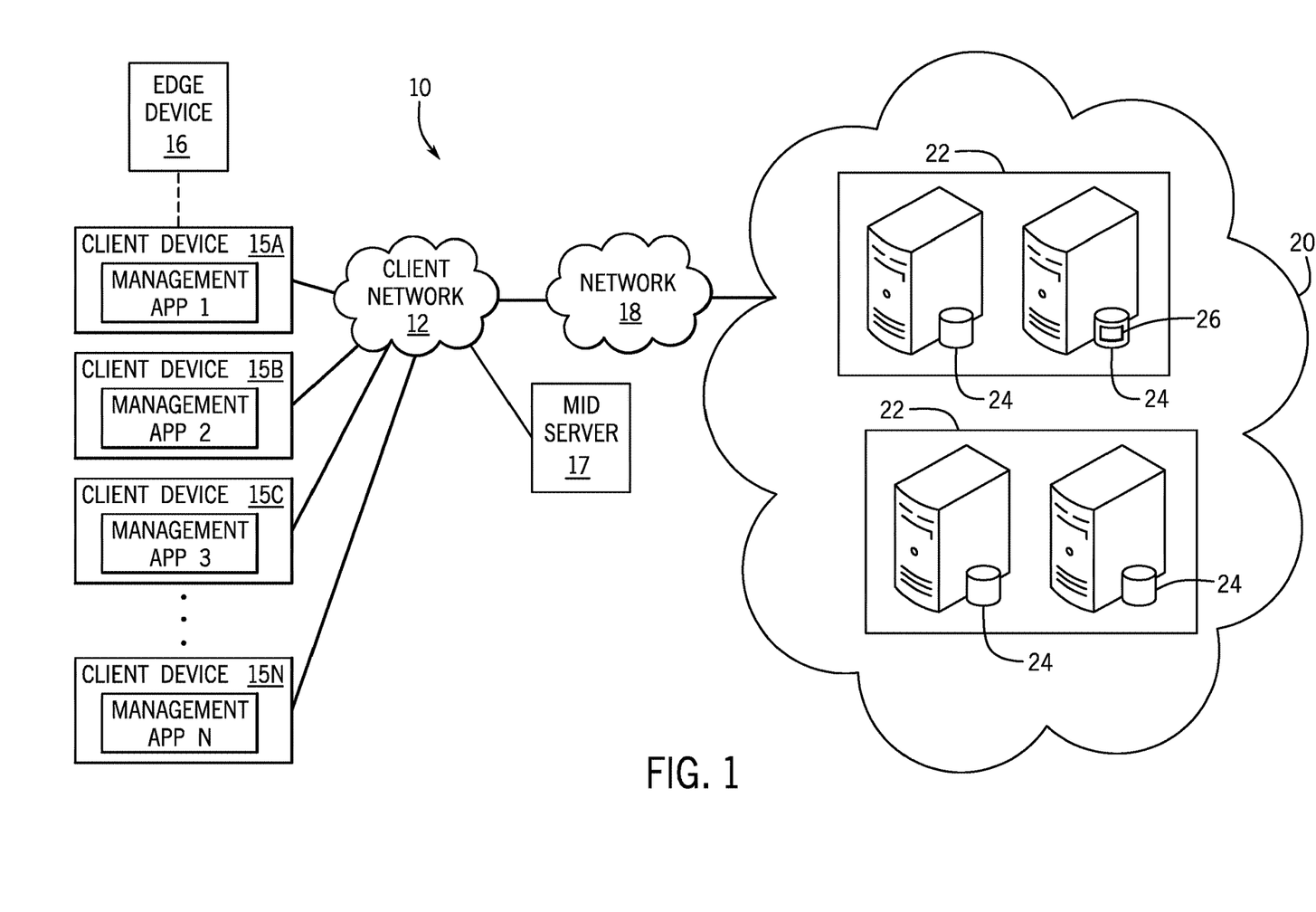
FIG. 1 is a block diagram of an embodiment of a cloud computing system in which embodiments of the present disclosure may operate.

With the preceding in mind, the following figures relate to various types of generalized system architectures or configurations that may be employed to provide services to an organization in a multi-instance framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, 14C, . . . , 14N so that the client devices are able to communicate with each other and/or with the network hosting the platform 20. The client devices 14A-N may be computing systems and/or other types of computing devices generally referred to as Internet of Things (IoT) devices that access cloud computing services, for example, via a web browser application or via an edge device 16 that may act as a gateway between the client devices and the platform 20. The client devices 14A-N may each store and execute a management application 15A-N. The management applications 15A-N may manage a stage of project management of a software application, such as development, building, testing, and the like. In many cases, the management applications 15A-N may be provided or developed by a third party with respect to the provider of the platform 20. As such, the management applications 15A-N may be third party software development management or commit applications, software build management applications, software testing management applications, or the like.

FIG. 1 also illustrates that the client network 12 includes a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-N and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-N via the client network 12 and network 18. The network hosting the platform 20 provides additional computing resources to the client devices 14A-N and/or client network 12. For example, by utilizing the network hosting the platform 20, users of client devices 14A-N are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY). In some embodiments, one or more virtual servers 24 may host, store, or otherwise provide access to a software application 26 that may be developed, built, and/or tested by a software developer using a client device 14A-N. Development or commit events, build events, and/or test events, that correspond to changes in developing, building, and/or testing, respectively, the software application 26 may be managed by the management applications 15A-N.

To utilize computing resources within the platform 20, network operators may choose to configure the data centers 22 using a variety of computing infrastructures. In one embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
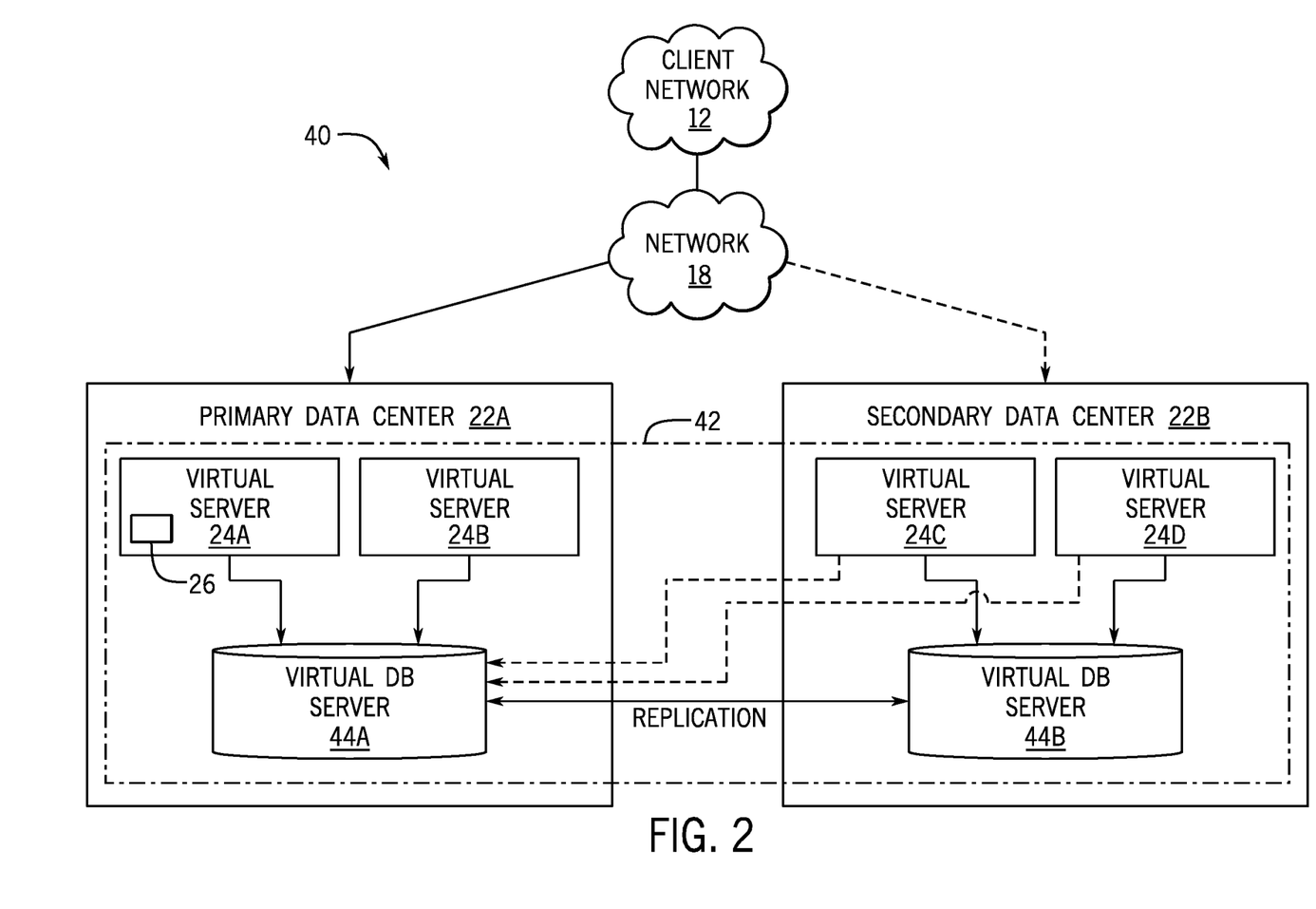
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-D and virtual database servers 44A and 44B are not shared with other client instances but are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-D, dedicated virtual database servers 44A and 44B, and additional dedicated virtual web servers (not shown in FIG. 2). As discussed above, one or more virtual servers 24A-D may host, store, or otherwise provide access to a software application 26 that may be developed, built, and/or tested by a software developer using a client device 14A-N.

In the depicted example, to facilitate availability of the client instance 42, the virtual servers 24A-D and virtual database servers 44A and 44B are allocated to two different data centers 22A and 22B, where one of the data centers 22 acts as a backup data center. In reference to FIG. 2, data center 22A acts as a primary data center 22A that includes a primary pair of virtual servers 24A and 24B and the primary virtual database server 44A associated with the client instance 42, and data center 22B acts as a secondary data center 22B to back up the primary data center 22A for the client instance 42. To back up the primary data center 22A for the client instance 42, the secondary data center 22 includes a secondary pair of virtual servers 24C and 24D and a secondary virtual database server 44B. The primary virtual database server 44A is able to replicate data to the secondary virtual database server 44B.

As shown in FIG. 2, the primary virtual database server 44A may replicate data to the secondary virtual database server 44B using, e.g., a Master-Master MySQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual server into a single virtual server. Using FIG. 2 as an example, the virtual servers 24A-D and virtual database servers 44A and 44B may be combined into a single virtual server. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
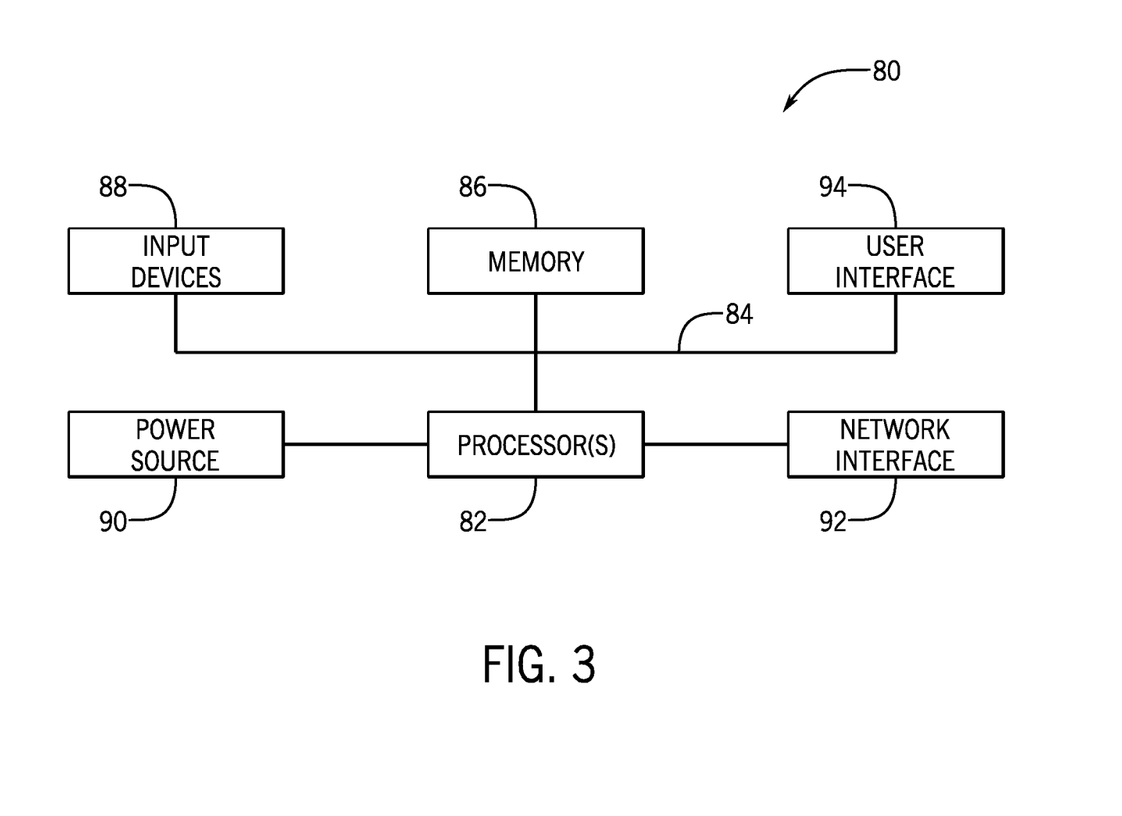
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
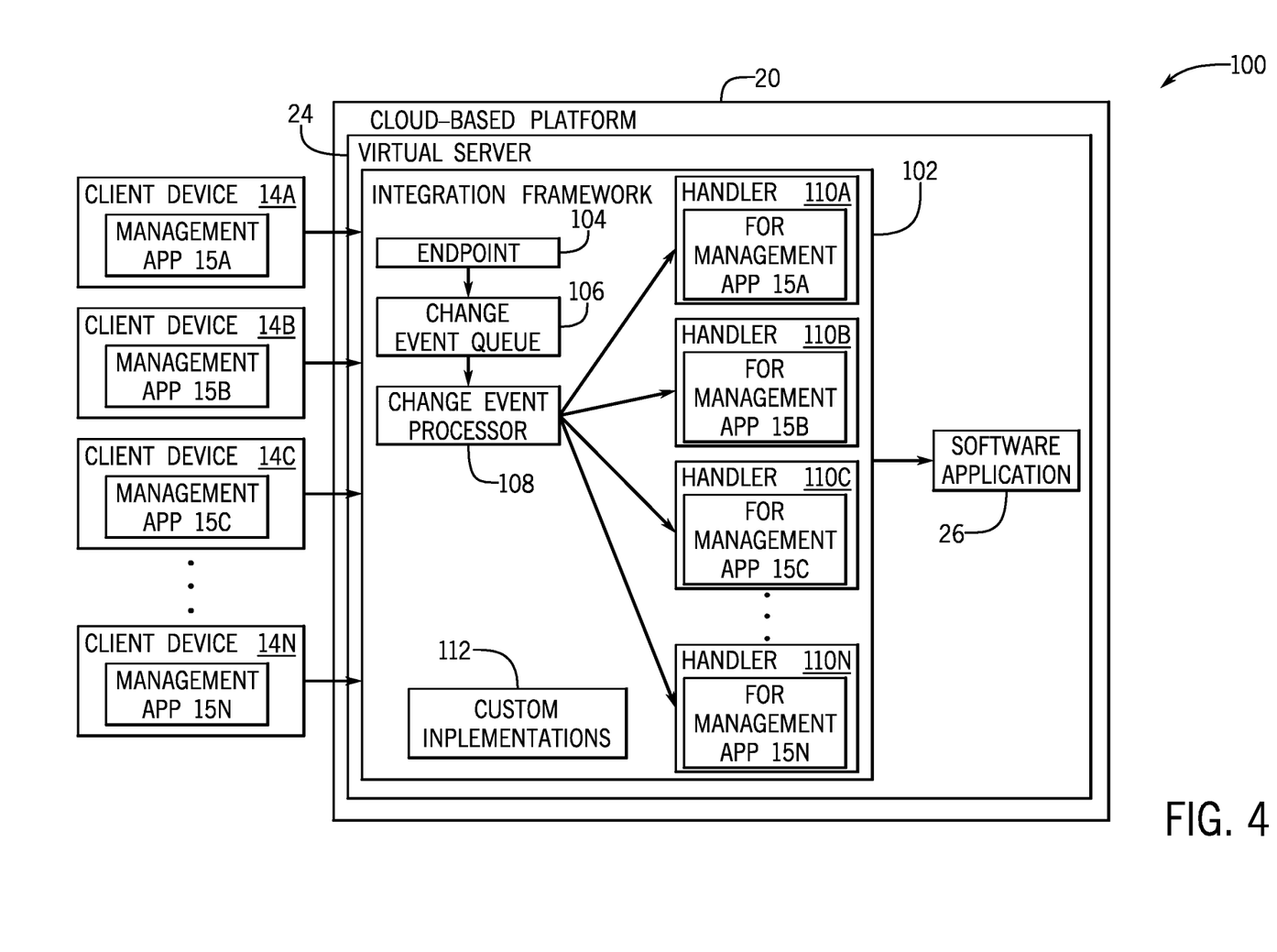
FIG. 4 is a high-level diagram of a system for efficiently implementing change events managed by management applications (executed on client devices) on a software application, in accordance with embodiments of the present disclosure.

With the foregoing in mind, FIG. 4 is a high-level diagram of a system 100 for efficiently implementing change events managed by management applications 15A-N (executed on client devices 14A-N) on a software application 26, in accordance with embodiments of the present disclosure. The software application 26 may be hosted, stored, or otherwise accessed on one or more virtual servers 24. Any of the client devices 14A-N may generate a change event on the software application 26, which may include commit events, build events, test events, or any other suitable project management event that may be implemented on the software application 26 and the like. The change event may be generated on the management applications 15A-N executed on the client devices 14A-N. The management applications 15A-N may each store a change event in a different, proprietary format based on the respective management application 15A-N.

For example, a software developer may use the client device 14A to make and/or commit a change to the source code of the software application 26. The management application 15A may then manage and/or store the change to the source code of the software application 26 as a change event (in a proprietary format of the management application 15A). As another example, a software builder or packager may use the client device 14B to build a package (e.g., a version) of the software application 26. The management application 15B may then manage and/or store the new package of the software application 26 as the change event (in a proprietary format of the management application 15A). As yet another example, a software tester may use the client device 14C to test the software application 26. The management application 15C may then manage and/or store the test results as the change event (in a proprietary format of the management application 15A).

Regardless of the type of change event, the management application (e.g., 15A) may send the change event to the virtual server 24. The virtual server 24 may include an integration framework 102 that receives change events in multiple, different formats based on the multiple, different management applications 15A-N sending the change events, and implements the change events on the software application 26. In particular, the integration framework 102 may include an endpoint 104 that receives the change event from the management application 15A. In some embodiments, the endpoint 104 may receive an indication that the management application 15A managed and/or stored the change event. The endpoint 104 may be based on representational state transfer (REST) technology. That is, the endpoint 104 may provide interoperability between the client devices 14A-N and the cloud-based platform 20 over the Internet (e.g., using the Hypertext Transfer Protocol (HTTP)).

The endpoint 104 may then send and/or generate the change event to a change event queue 106. The change event queue 106 may receive and store change events and output the change events based on certain criteria. For example, the change event queue 106 may operate using a first in first out (FIFO) technique, such that the first change event to enter the change event queue 106 is the first to exit the change event queue 106. Additionally or alternatively, the change event queue 106 may operate based on a priority of the change events. For example, each change event may be associated with a priority level, and change events having higher priority levels may be outputted first from the change event queue 106. It should be understood that any suitable technique for operating the change event queue 106 is contemplated in the present disclosure.

A change event processor 108 may monitor the change event queue 106, and when the change event queue 106 is storing a change event, the change event processor 108 may read the change event from the change event queue 106. The change event processor 108 may determine which management application 15A-N managed and/or sent the change event, and then the change event processor 108 may send the change event to a handler 110 that corresponds to the management application 15A-N that managed and/or sent the change event.

The integration framework 102 may include multiple handlers 110A-N that each corresponds to a respective management application 15A-N. In particular, a corresponding handler 110A may be programmed to handle change events from the management application 15A and convert the change events from the format used by the management application 15A to a format that is usable to implement the change events on the software application 26. The handler 110A may then implement the change event on the software application 26.

Additionally, when a management application 15A-N is used that does not have a corresponding handler in the set of handlers 110A-N provided by the cloud-based platform 20, the corresponding handler may simply be developed or built and added to the platform 20, without affecting operation of the already existing handlers 110A-N. In some embodiments, the cloud-based platform 20 includes a custom implementation 112 that modifies one or more handlers 110A-N based on a user's preferences. That is, a developer (using a client device 14A-N) may implement custom modifications (e.g., related to how the change event is processed and/or applied to the software application 26) by programming the custom modifications in the custom implementation 112.

As such, the integration framework 102 may provide the flexibility to process change events generated by multiple, different management applications 15A-N having multiple, different formats. Moreover, the integration framework 102 may enable addition of new handlers to process additional management applications, without affecting operation of the already existing handlers 110A-N of the integration framework 102. The integration framework 102 may also enable custom implementations 112 (e.g., to modify how the change event is processed and/or applied to the software application 26) to the handlers 110A-N.

Figure 5:
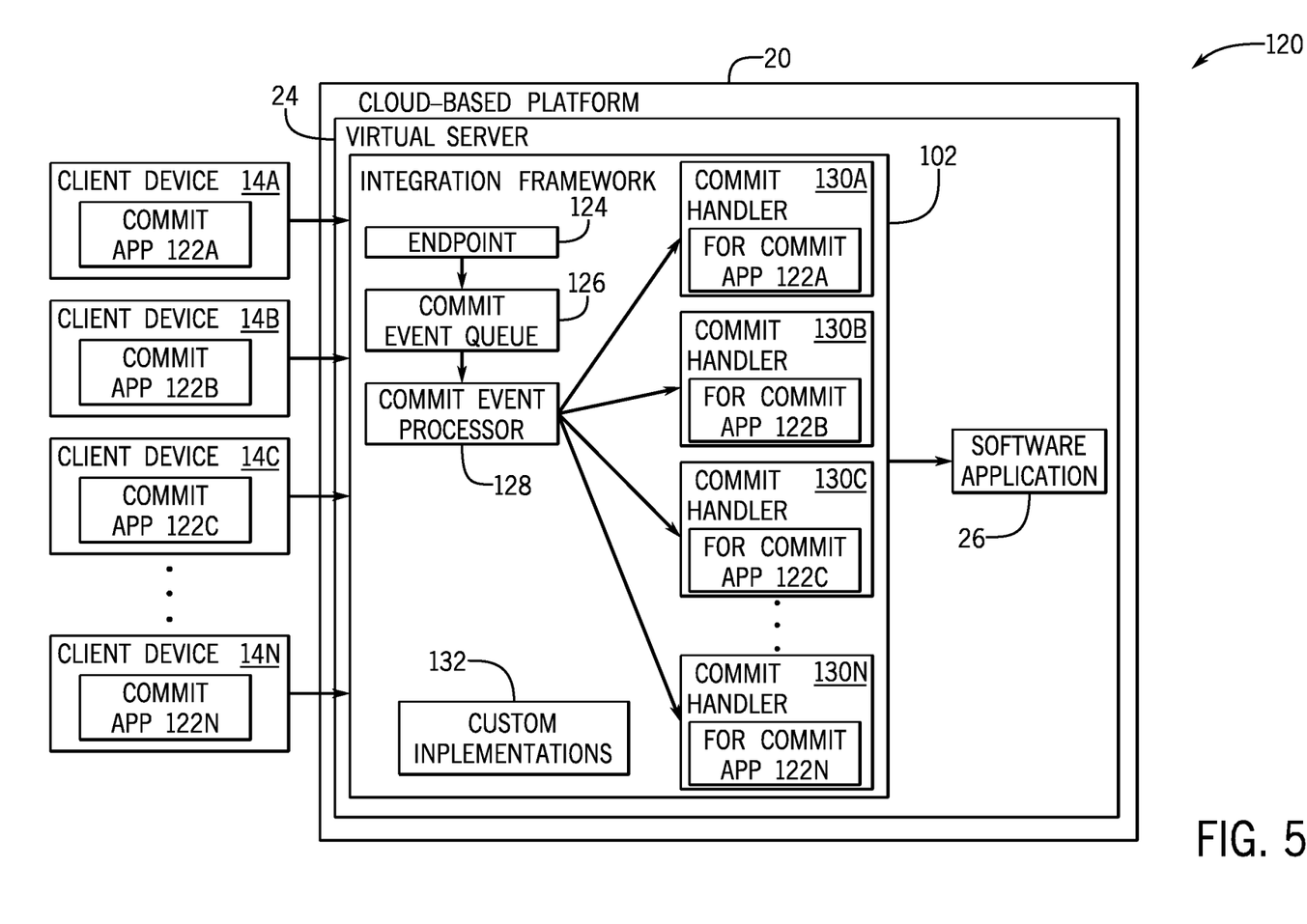
FIG. 5 is a high-level diagram of a system for efficiently implementing commit events managed by commit applications (executed on the client devices) N on a software application, in accordance with embodiments of the present disclosure.

As discussed above, the system 100 of FIG. 4 may implement change events that include commitments or "commits" of changes to the source code of the software application 26. FIG. 5 is a high-level diagram of a system 120 for efficiently implementing commit events managed by commit applications 122A-N (executed on the client devices 14A-N) on the software application 26, in accordance with embodiments of the present disclosure. The commit applications 122A-N may include any suitable application that enables commitment (e.g., saving and applying) changes to the source code of the software application 26. As such, a software developer may use the commit application 122A executing on the client device 14A to make and commit a change to the source code of the software application 26 (e.g., generate a commit to the source code of the software application 26). The commit applications 122A-N may each store a commit event in a different, proprietary format based on the respective commit application 122A-N. As such, the commit application 122A may manage and/or store the commit as a commit event in a proprietary format of the commit application 122A.

The commit application (e.g., 122A) may then send the commit event to the virtual server 24. The integration framework 102 of the virtual server 24 may receive the commit event from the commit application 122A, and implement the commit event to the software application 26. In particular, the integration framework 102 may include an endpoint 124 that receives the commit event from the commit application 122A. In some embodiments, the endpoint 124 may receive an indication that the commit application 122A managed and/or stored the commit event. The endpoint 124 may be based on representational state transfer (REST) technology. In some embodiments, the endpoint 124 may be included in and/or be the same endpoint 104 as shown in the system 100 of FIG. 4. Alternatively, the endpoint 124 may be separate from the endpoint 104 of the system 100 in FIG. 4 and may be programmed to specifically receive commit events (as opposed to the more general change events).

The endpoint 124 may send and/or generate the commit event to a commit event queue 126. The commit event queue 126 may receive and store commit events and output the commit events based on certain criteria. For example, the commit event queue 126 may operate using any suitable technique, such as a first in first out (FIFO) technique, a priority technique, and the like. In some embodiments, the commit event queue 126 may be included in and/or be the same as the change event queue 106 as shown in the system 100 of FIG. 4. Alternatively, the commit event queue 126 may be separate from the change event queue 106 of the system 100 in FIG. 4 and may be programmed to specifically store commit events (as opposed to the more general change events).

A commit event processor 128 may monitor the commit event queue 126, and when the commit event queue 126 is storing a commit event, the commit event processor 128 may read the commit event from the commit event queue 126. The commit event processor 128 may determine which commit application 122A-N managed and/or sent the commit event, and then the commit event processor 128 may send the commit event to a commit handler 130 that corresponds to the commit application 122A-N that managed and/or sent the commit event. In some embodiments, the commit event processor 128 may be included in and/or be the same as the change event processor 108 as shown in the system 100 of FIG. 4. Alternatively, the commit event processor 128 may be separate from the change event processor 108 of the system 100 in FIG. 4 and may be programmed to specifically determine which commit application 122A-N managed and/or sent the commit event (as opposed to the more general change events).

The integration framework 102 may include multiple commit handlers 130A-N that each corresponds to a respective commit application 122A-N. In particular, a corresponding commit handler 130A may be programmed to handle commit events from the commit application 122A and convert the commit events from the format used by the commit application 122A to a format that is usable to implement the commit events on the software application 26. The commit handler 130A may then implement the commit event on the software application 26. For example, the commit handler 130A may add the commit event to a set of commit events stored by the software application 26 and/or may update the software application 26 based on the commit event. That is, the commit handler 130A may apply changes to the source code of the software application 26 based on or included in the commit event to the software application 26.

Additionally, when a commit application 122A-N is used that does not have a corresponding commit handler in the set of commit handlers 130A-N provided by the cloud-based platform 20, the corresponding commit handler may simply be developed or built and added to the platform 20, without affecting operation of the already existing commit handlers 130A-N. In some embodiments, the cloud-based platform 20 includes a custom implementation 132 that modifies one or more commit handlers 130A-N based on a developer's preferences. That is, a developer (using a client device 14A-N) may implement custom modifications (e.g., related to how the commit event is processed and/or applied to the software application 26) by programming the custom modifications in the custom implementation 132.

As such, the integration framework 102 may provide the flexibility to process commit events generated by multiple, different commit applications 122A-N having multiple, different formats. Moreover, the integration framework 102 may enable addition of new commit handlers to process additional commit applications, without affecting operation of the already existing commit handlers 130A-N of the integration framework 102. The integration framework 102 may also enable custom implementations 132 (e.g., to modify how the commit event is processed and/or applied to the software application 26) to the development hand 130A-N.

Figure 6:
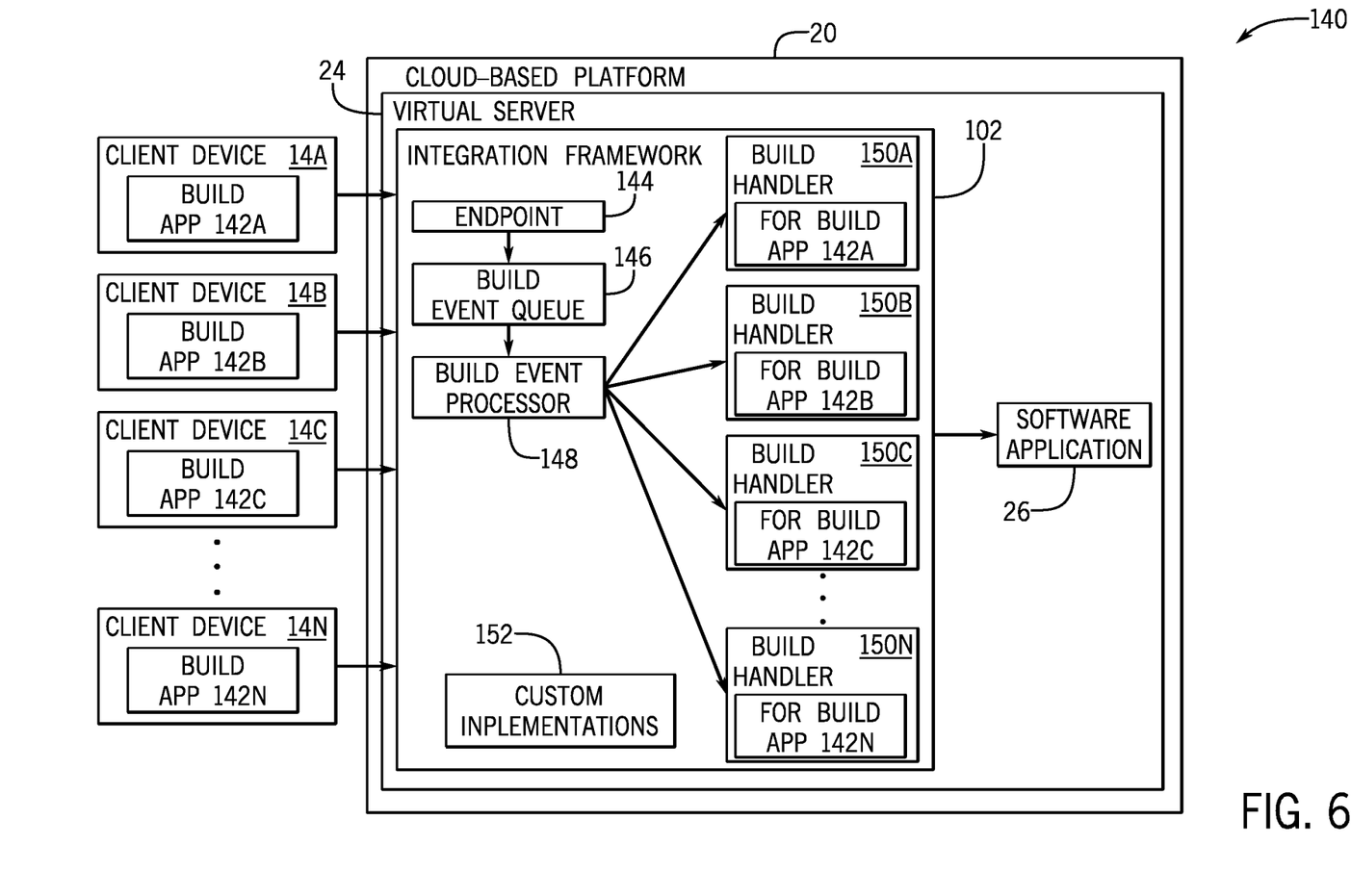
FIG. 6 is a high-level diagram of a system for efficiently implementing build events managed by build applications (executed on the client devices) on a software application, in accordance with embodiments of the present disclosure.

Additionally, as discussed above, the system 100 of FIG. 4 may implement change events that include building a package (e.g., a new version) of the software application 26. FIG. 6 is a high-level diagram of a system 140 for efficiently implementing build events managed by build applications 142A-N (executed on the client devices 14A-N) on the software application 26, in accordance with embodiments of the present disclosure. The build applications 142A-N may include any suitable application that enables building a package of the software application 26. As such, a software builder may use the build application 142A executing on the client device 14A to build a package of the software application 26. The build applications 142A-N may each store a build event in a different, proprietary format based on the respective build application 142A-N. As such, the build application 142A may manage and/or store the package as a build event in a proprietary format of the build application 142A.

The build application (e.g., 142A) may then send the build event to the virtual server 24. The integration framework 102 of the virtual server 24 may receive the build event from the build application 142A, and implement the build event to the software application 26. In particular, the integration framework 102 may include an endpoint 144 that receives the build event from the build application 142A. In some embodiments, the endpoint 144 may receive an indication that the build application 142A managed and/or stored the build event. The endpoint 144 may be based on representational state transfer (REST) technology. In some embodiments, the endpoint 144 may be included in and/or be the same endpoint 104 as shown in the system 100 of FIG. 4. Alternatively, the endpoint 144 may be separate from the endpoint 104 of the system 100 in FIG. 4 and may be programmed to specifically receive build events (as opposed to the more general change events).

The endpoint 144 may send and/or generate the build event to a build event queue 146. The build event queue 146 may receive and store build events and output the build events based on certain criteria. For example, the build event queue 146 may operate using any suitable technique, such as a first in first out (FIFO) technique, a priority technique, and the like. In some embodiments, the build event queue 146 may be included in and/or be the same as the change event queue 106 as shown in the system 100 of FIG. 4. Alternatively, the build event queue 146 may be separate from the change event queue 106 of the system 100 in FIG. 4 and may be programmed to specifically store build events (as opposed to the more general change events).

A build event processor 148 may monitor the build event queue 146, and when the build event queue 146 is storing a build event, the build event processor 148 may read the build event from the build event queue 146. The build event processor 148 may determine which build application 142A-N managed and/or sent the build event, and then the build event processor 148 may send the build event to a build handler 150 that corresponds to the build application 142A-N that managed and/or sent the build event. In some embodiments, the build event processor 148 may be included in and/or be the same as the change event processor 108 as shown in the system 100 of FIG. 4. Alternatively, the build event processor 148 may be separate from the change event processor 108 of the system 100 in FIG. 4 and may be programmed to specifically determine which build application 142A-N managed and/or sent the build event (as opposed to the more general change events).

The integration framework 102 may include multiple build handlers 150A-N that each corresponds to a respective build application 142A-N. In particular, a corresponding build handler 150A may be programmed to handle build events from the build application 142A and convert the build events from the format used by the build application 142A to a format that is usable to implement the build events on the software application 26. The build handler 150A may then implement the build event on the software application 26. For example, the build handler 150A may add the build event to a set of build events stored by the software application 26 and/or may update the software application 26 based on the build event. That is, the build handler 130A may replace a current package of the software application 26 with the package based on or included in the build event.

Additionally, when a build application 142A-N is used that does not have a corresponding build handler in the set of build handlers 150A-N provided by the cloud-based platform 20, the corresponding build handler may simply be developed or built and added to the platform 20, without affecting operation of the already existing build handlers 150A-N. In some embodiments, the cloud-based platform 20 includes a custom implementation 152 that modifies one or more build handlers 150A-N based on a builder's preferences. That is, a builder (using a client device 14A-N) may implement custom modifications (e.g., related to how the build event is processed and/or applied to the software application 26) by programming the custom modifications in the custom implementation 152.

As such, the integration framework 102 may provide the flexibility to process build events generated by multiple, different build applications 142A-N having multiple, different formats. Moreover, the integration framework 102 may enable addition of new build handlers to process additional build applications, without affecting operation of the already existing build handlers 150A-N of the integration framework 102. The integration framework 102 may also enable custom implementations 152 (e.g., to modify how the build event is processed and/or applied to the software application 26) to the build handlers 150A-N.

Figure 7:
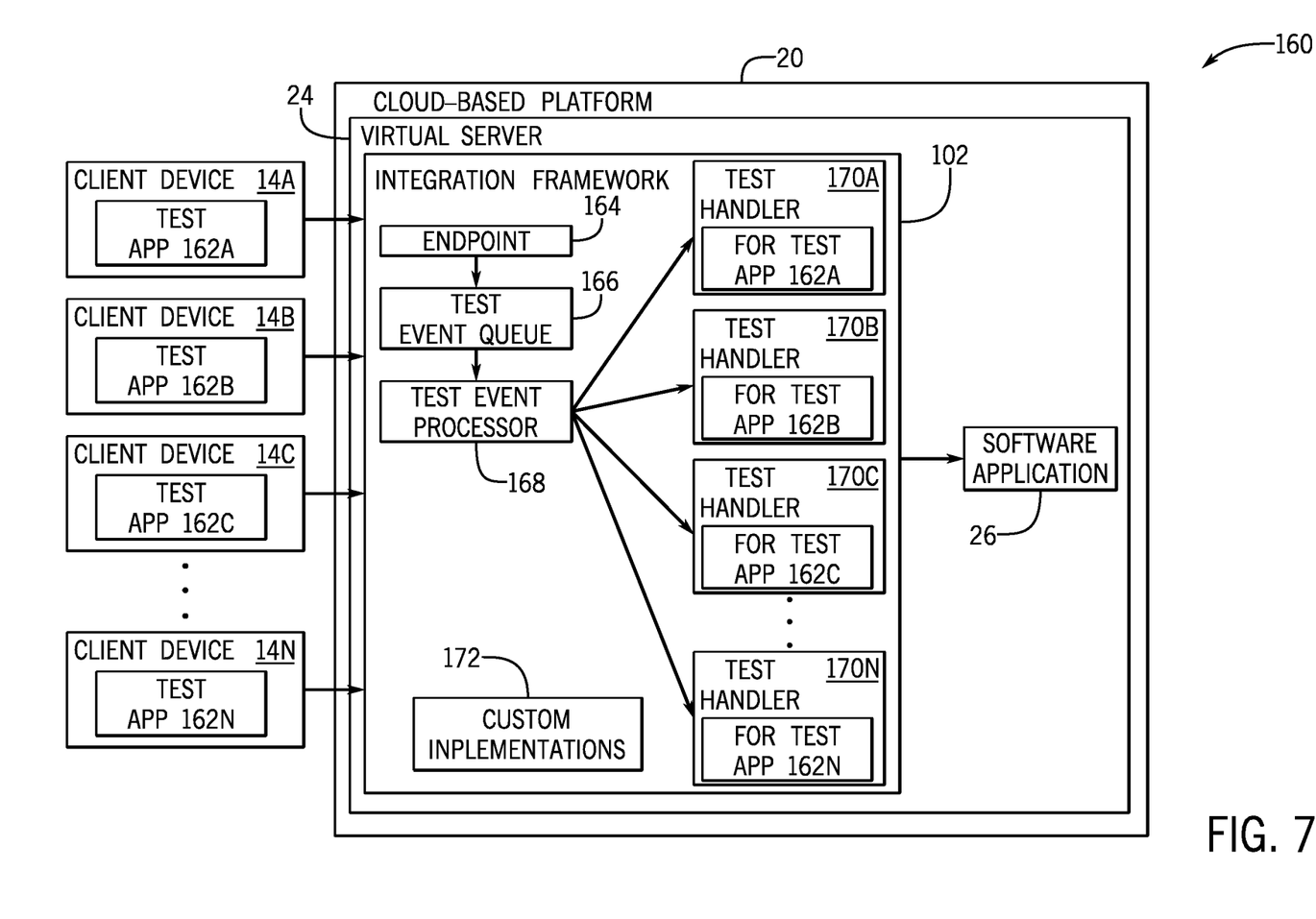
FIG. 7 is a high-level diagram of a system for efficiently implementing test events managed by test applications (executed on the client devices) on a software application, in accordance with embodiments of the present disclosure.

Moreover, as discussed above, the system 100 of FIG. 4 may implement change events that include testing the software application 26. FIG. 7 is a high-level diagram of a system 160 for efficiently implementing test events managed by test applications 162A-N (executed on the client devices 14A-N) on the software application 26, in accordance with embodiments of the present disclosure. The test applications 162A-N may include any suitable application that enables testing the software application 26. As such, a software tester may use the test application 162A executing on the client device 14A to test the software application 26 and generate and store test events (e.g., results) based on the testing. The test applications 162A-N may each store a test event in a different, proprietary format based on the respective test application 162A-N. As such, the test application 162A may manage and/or store test results as test events in a proprietary format of the test application 162A.

The test application (e.g., 162A) may then send the test event to the virtual server 24. The integration framework 102 of the virtual server 24 may receive the test event from the test application 162A, and apply the test event to the software application 26. In particular, the integration framework 102 may include an endpoint 164 that receives the test event from the test application 162A. In some embodiments, the endpoint 164 may receive an indication that the test application 162A managed and/or stored the test event. The endpoint 164 may be based on representational state transfer (REST) technology. In some embodiments, the endpoint 164 may be included in and/or be the same endpoint 104 as shown in the system 100 of FIG. 4. Alternatively, the endpoint 164 may be separate from the endpoint 104 of the system 100 in FIG. 4 and may be programmed to specifically receive test events (as opposed to the more general change events).

The endpoint 164 may send and/or generate the test event to a test event queue 166. The test event queue 166 may receive and store test events and output the test events based on certain criteria. For example, the test event queue 166 may operate using any suitable technique, such as a first in first out (FIFO) technique, a priority technique, and the like. In some embodiments, the test event queue 166 may be included in and/or be the same as the change event queue 106 as shown in the system 100 of FIG. 4. Alternatively, the test event queue 166 may be separate from the change event queue 106 of the system 100 in FIG. 4 and may be programmed to specifically store test events (as opposed to the more general change events).

A test event processor 168 may monitor the test event queue 166, and when the test event queue 166 is storing a test event, the test event processor 168 may read the test event from the test event queue 166. The test event processor 168 may determine which test application 162A-N managed and/or sent the test event, and then the test event processor 168 may send the test event to a test handler 170 that corresponds to the test application 162A-N that managed and/or sent the test event. In some embodiments, the test event processor 168 may be included in and/or be the same as the change event processor 108 as shown in the system 100 of FIG. 4. Alternatively, the test event processor 168 may be separate from the change event processor 108 of the system 100 in FIG. 4 and may be programmed to specifically determine which test application 162A-N managed and/or sent the test event (as opposed to the more general change events).

The integration framework 102 may include multiple test handlers 170A-N that each corresponds to a respective test application 162A-N. In particular, a corresponding test handler 170A may be programmed to handle test events from the test application 162A and convert the test events from the format used by the test application 162A to a format that is usable to implement the test events on the software application 26. The test handler 170A may then apply the test event on the software application 26. For example, the test handler 170A may add the test event to a set of test events stored by the software application 26 and/or may update the software application 26 based on the test event.

Additionally, when a test application 162A-N is used that does not have a corresponding test handler in the set of test handlers 162A-N provided by the cloud-based platform 20, the corresponding test handler may simply be developed or built and added to the platform 20, without affecting operation of the already existing test handlers 170A-N. In some embodiments, the cloud-based platform 20 includes a custom implementation 172 that modifies one or more test handlers 170A-N based on a tester's preferences. That is, a tester (using a client device 14A-N) may implement custom modifications (e.g., related to how the test event is processed and/or applied to the software application 26) by programming the custom modifications in the custom implementation 172.

As such, the integration framework 102 may provide the flexibility to process test events generated by multiple, different test applications 162A-N having multiple, different formats. Moreover, the integration framework 102 may enable addition of new test handlers to process additional test applications, without affecting operation of the already existing test handlers 170A-N of the integration framework 102. The integration framework 102 may also enable custom implementations 172 (e.g., to modify how the test event is processed and/or applied to the software application 26) to the test handlers 170A-N.

Figure 8:
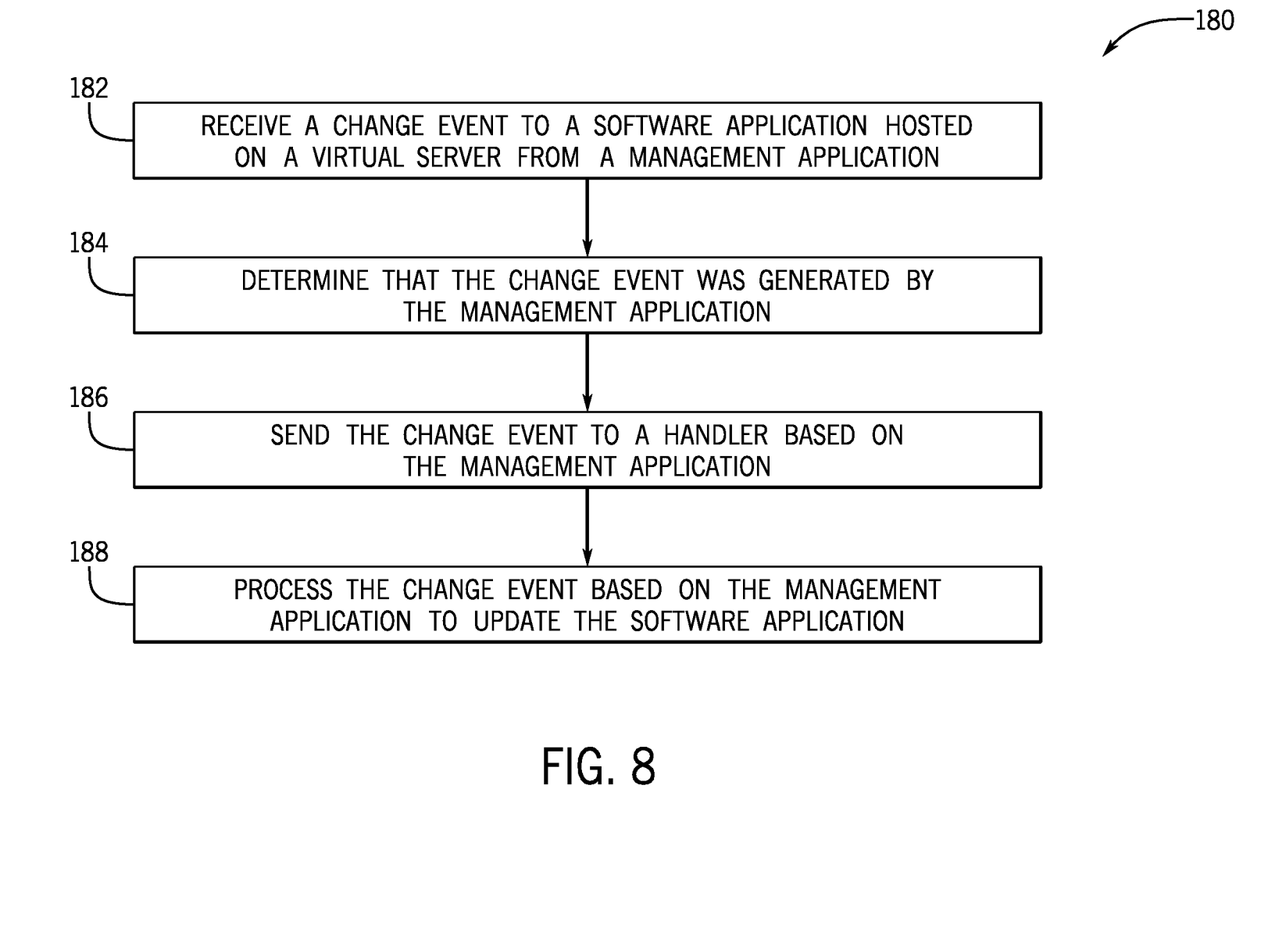
FIG. 8 is a flowchart of a process for efficiently implementing change events managed by management applications (executed on the client devices) on a software application, in accordance with embodiments of the present disclosure.

FIG. 8 is a flowchart of a process 180 for efficiently implementing change events managed by management applications 15A-N (executed on the client devices 14A-N) on the software application 26, in accordance with embodiments of the present disclosure. The process 180 may be in the form of an application that includes instructions that are executed by at least one suitable processor of a computer system as part of the integration framework 102, the platform 20, the virtual server 24, the client instance 42, the client device (e.g., 14A), and the like. The illustrated process 180 is merely provided as an example, and in other embodiments, certain illustrated steps of the process 180 may be performed in other orders, skipped, or repeated, in accordance with the present disclosure.

As illustrated, in process block 182, the integration framework 102 may receive a change event to the software application 26 hosted on the virtual server 24 from a management application (e.g., 15A). In particular, the endpoint 104 of the integration framework 102 may receive the change event from the management application 15A. In some embodiments, the integration framework 102 may receive an indication from the management application 15A that the change event has occurred. The change event may include any suitable project management event, such as a development or commit event, build event, test event, or the like.

In process block 184, the integration framework 102 may then determine that the change event was generated by the management application 15A. In particular, the endpoint 104 may send the change event to the change event queue 106, which may store the change event. The change event processor 108 may then read the change event from the change event queue 106, and determine that the change event was generated by the management application 15A. The change event processor 108 may determine that the change event was generated by the management application 15A by any suitable technique. For example, the change event processor 108 may determine that the change event was generated by the management application 15A based on a characteristic or parameter associated with the management application 15A, such as a file suffix of the change event. In some embodiments, the change event processor 108 may determine that the change event was generated by the management application 15A based on an indication associated with the management application 15A sent by the management application 15A and received by the endpoint 104.

In process block 186, the integration framework 102 may send the change event to the handler 110A based on the management application 15A. In particular, the change event processor 108 of the integration framework 102 may send the change event to the handler 110A that is configured to process change events managed and sent by the management application 15A. In some embodiments, the handler 110A associated with the management application 15A may be programmed to handle change events from the management application 15A and convert the change events from the format used by the management application 15A to a format that is usable to implement the change events on the software application 26.

In process block 188, the integration framework 102 may then process the change event based on the management application 15A to update the software application 26. In particular, the handler 110A may process the change event by handling the change event from the management application 15A and/or converting the change event from the format used by the management application 15A to a format that is usable to implement the change events on the software application 26. The handler 110A may then update the software application 26 by implementing the change event on the software application 26. For example, if the change event is a commit event, the handler 110A may add the commit event to a set of commit events stored by the software application 26 and/or may update the software application 26 based on the commit event. That is, the handler 110A may apply changes to the source code of the software application 26 based on or included in the commit event to the software application 26. As another example, if the change event is a build event, the handler 110A may add the build event to a set of build events stored by the software application 26 and/or may update the software application 26 based on the build event. That is, the handler 110A may replace a current package of the software application 26 with a package based on or included in the build event. As yet another example, the handler 110A may add the test event to a set of test events stored by the software application 26 and/or may update the software application 26 based on the test event.

In this manner, the process 180 provides a flexible, scalable, and robust solution that implements change events managed by multiple third-party management applications 15A-N on a software application 26.

The technical effects of the present disclosure include the cloud-based platform 20 having an endpoint 104 that receives a change event to a software application 26 hosted by a virtual server 24 from a management application (e.g., a third party management application 15A). In some embodiments, the change event includes a commit event, build event, or test event implemented on the software application 26. As such, the management application 15A manages commit events, build events, or test events implemented on the software application 26. The cloud-based platform 20 also includes a change event processor 108 that determines that the change event was generated by the management application 15A and sends the change event to a handler (e.g., 110A) based on the management application 15A. The cloud-based platform 20 further includes the handler 110A of a set of handlers 110A-N that processes the change event based on the management application 15A to update the software application 26. Indeed, each handler 110A-N of the set of handlers 110A-N corresponds to a respective management application 15A-N and is configured to process a respective change event generated by the respective management application 15A-N. Advantageously, when a management application 15A-N is used that does not have a corresponding handler in the set of handlers 110A-N provided by the cloud-based platform 20, the corresponding handler may simply be developed or built and added to the platform 20, without affecting operation of the already existing handlers 110A-N. In some embodiments, the cloud-based platform 20 includes a custom implementation 112 that modifies the handler 110A-N based on a user's preferences.

In this manner, the cloud-based platform 20 provides a flexible, scalable, and robust solution that implements commit, build, and test events managed by multiple third-party management applications 15A-N on a software application 26.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a virtual server configured to host a software application, wherein a plurality of management applications is configured to generate a plurality of change events based on a plurality of client devices generating a plurality of changes to the software application, wherein a first management application of the plurality of management applications is developed by a different third party than a second management application of the plurality of management applications; and
an information technology platform comprising:
an endpoint configured to read the plurality of change events;
a change event queue configured to store the plurality of change events;
a change event processor configured to monitor the change event queue, and, for each change event of the plurality of change events:
determine a respective management application of the plurality of management applications that generated a respective change event; and
send the respective change event to a respective handler of a plurality of handlers corresponding to the respective management application; and
the plurality of handlers configured to process the plurality of change events based on the plurality of management applications to update the software application, wherein the plurality of handlers comprise the respective handler configured to process the respective change event based on the respective management application to update the software application.

2. The system of claim 1, wherein the information technology platform comprises a custom implementation configured to modify the respective handler of the plurality of handlers based on developer preferences.

3. The system of claim 1, wherein the endpoint is based on representational state transfer technology.

4. The system of claim 1, wherein an integration framework comprises the endpoint, the change event queue, the change event processor, and the plurality of handlers.

5. One or more tangible, non-transitory, computer-readable media having instructions stored thereon, wherein the instructions are configured to cause:
an endpoint to receive a plurality of change events to a software application hosted by a virtual server from a plurality of management applications, wherein a first management application of the plurality of management applications is developed by a different third party than a second management application of the plurality of management applications;
a change event processor to monitor a change event queue, and, for each change event of the plurality of change events:
determine a respective management application of the plurality of management applications that generated a respective change event; and
send the respective change event to a respective handler of a plurality of handlers corresponding to the respective management application; and
the respective handler to process the respective change event based on the respective management application to update the software application.

6. The one or more tangible, non-transitory, computer-readable media of claim 5, having instructions configured to cause the plurality of management applications to manage software development events performed on the software application.

7. The one or more tangible, non-transitory, computer-readable media of claim 6, wherein each of the software development events comprises committing a change in source code of the software application.

8. The one or more tangible, non-transitory, computer-readable media of claim 5, having instructions configured to cause the plurality of management applications to manage software build events performed on the software application.

9. The one or more tangible, non-transitory, computer-readable media of claim 8, wherein each of the software build events comprises building a software package of the software application.

10. The one or more tangible, non-transitory, computer-readable media of claim 5, having instructions configured to cause the plurality of management applications to manage software test events performed on the software application.

11. The one or more tangible, non-transitory, computer-readable medium of claim 10, wherein each of the software test events comprises reporting a software test result of the software application.

12. The one or more tangible, non-transitory, computer-readable media of claim 5, having instructions configured to cause the change event queue to store the plurality of change events.

13. The one or more tangible, non-transitory, computer-readable media of claim 5, wherein the change event processor is configured to monitor the change event queue and, for each change event of the plurality of change events, determine the respective management application of the plurality of management applications that generated a respective change event based on receiving an indication that the respective change event is stored in the change event queue.

14. A method comprising:
receiving a first change event to a software application hosted by a virtual server from a first management application;
receiving a second change event to the software application from a second management application, wherein the first management application is developed by a different third party than the second management application;
determining that the first management application generated the first change event;
determining that the second management application generated the second change event;
processing the first change event based on the first management application to update the software application; and
processing the second change event based on the second management application to update the software application.

15. The method of claim 14, wherein the first change event is based on a first client device generating a first change in the software application, and wherein the second change event is based on a second client device generating a second change in the software application.

16. The method of claim 14, comprising storing the first change event and the second change event in a change event queue.

17. The method of claim 16, comprising monitoring the change event queue, wherein determining that the first management application generated the first change event is based on receiving a first indication that the first change event is stored in the change event queue, and wherein determining that the second management application generated the second change event is based on receiving a second indication that the second change event is stored in the change event queue.

18. The system of claim 1, wherein each of the plurality of management applications is stored and executed by a respective client device of the plurality of client devices.

19. The system of claim 1, wherein each of the plurality of management applications comprises software development management applications, software build management applications, software testing management applications, or any combination thereof, developed by a respective third party.

20. The system of claim 1, wherein the software application hosted by the virtual server is developed, built, and tested on the plurality of client devices, wherein the software application is managed by the plurality of management applications based on development event, build events, and test events that correspond to changes in developing, building, and testing, respectively.

* * * * *